United States Patent
Lazier et al.

(10) Patent No.: US 9,891,866 B1
(45) Date of Patent: Feb. 13, 2018

(54) EFFICIENT DATA RETRIEVAL BASED ON RANDOM READS

(71) Applicant: Amazon Technologies, Inc., Reno, NV (US)

(72) Inventors: Colin L. Lazier, Seattle, WA (US); Kestutis Patiejunas, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 265 days.

(21) Appl. No.: 13/633,011

(22) Filed: Oct. 1, 2012

(51) Int. Cl.
*G06F 12/00* (2006.01)
*G06F 3/06* (2006.01)
*G06F 11/10* (2006.01)

(52) U.S. Cl.
CPC .......... *G06F 3/0689* (2013.01); *G06F 3/0613* (2013.01); *G06F 3/0659* (2013.01); *G06F 11/1096* (2013.01); *G06F 2211/1028* (2013.01)

(58) Field of Classification Search
CPC .............. G06F 11/1096; G06F 3/0689; G06F 2211/1028
USPC .......................... 711/112, 148, 154, 157, 170
See application file for complete search history.

(56) References Cited

U.S. PATENT DOCUMENTS 5,926,649 A * 7/1999 Ma et al. ..................... 710/6
6,487,633 B1 * 11/2002 Horst et al. ................ 711/112
2006/0107005 A1 * 5/2006 Philippe Andre ... G06F 11/1441 711/162
2006/0168408 A1 * 7/2006 Nowshadi ..................... 711/157
2008/0065827 A1 * 3/2008 Byrne et al. .................. 711/114
2009/0119453 A1 * 5/2009 Igashira et al. ............... 711/114
2013/0117525 A1 * 5/2013 Jess et al. ..................... 711/171
2014/0068182 A1 * 3/2014 Terry ............................ 711/114

OTHER PUBLICATIONS

Jadav, Divyesh; Srinilta, Chutimet; Choudhary, Alok; and Berra, P. B., "Techniques for Scheduling I/O in a High Performance Multimedia-on-Demand Server" (1995). Electrical Engineering and Computer Science. Paper 86. p. 10.*
Intel, Configuring RAID for Optimal Performance, Sep. 2008, Intel Corporation, Revision 1.1, p. 7.*

* cited by examiner

*Primary Examiner* — Reginald Bragdon
*Assistant Examiner* — Michael Westbrook
(74) *Attorney, Agent, or Firm* — Kilpatrick Townsend & Stockton LLP

(57) ABSTRACT

Methods and systems are described herein to provide efficient data retrieval in a data storage system. Specifically, in cases where users of a data storage system are not overly sensitive to data retrieval time, such as the case for backup and archival data storage systems, random read requests may be fulfilled as part of sequential reads to reduce I/O operations. A data storage system may be divided into data storage zones. Sequential reads may be performed for data stored in those data storage zones with pending data retrieval requests. Data retrieval requests may be fulfilled based at least in part on the sequentially-read data.

23 Claims, 13 Drawing Sheets

EFFICIENT DATA RETRIEVAL BASED ON RANDOM READS

BACKGROUND

Modern data storage systems typically allow customers to perform retrieval of data objects stored in the data storage systems. Such retrieval may involve the performance of a large number of Input/Output (I/O) operations (such as random reads) by the data storage system. As the amount of customer data increases, the number of such data retrieval requests is expected to increase. However, despite of advances in data storage technologies, such as the increasing disk density of hard disk drives, the numbers of I/O operations provided by most data storage systems for a given period of time (such as measured, for example, by I/O Operations per Second (IOPS)) can be inadequate.

BRIEF DESCRIPTION OF THE DRAWINGS

Various embodiments in accordance with the present disclosure will be described with reference to the drawings, in which.

DETAILED DESCRIPTION

Figure 1:
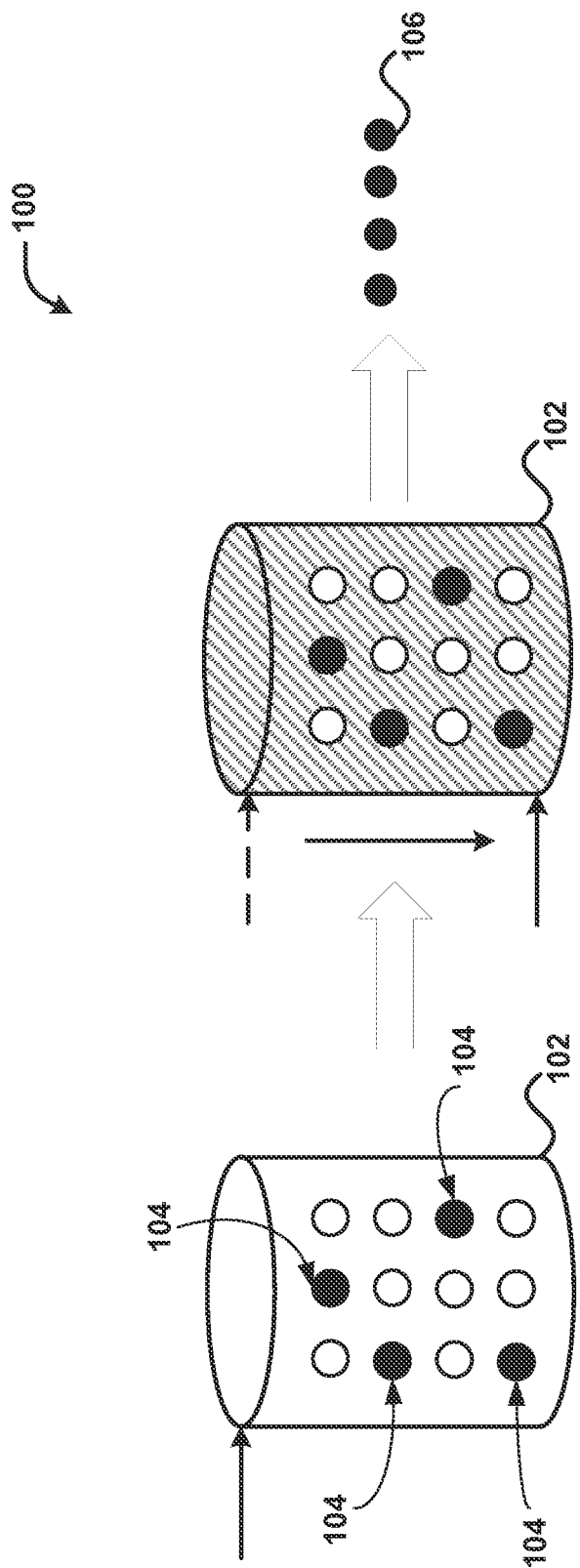
FIG. 1 shows a diagram illustrating data retrieval, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods and systems for providing efficient data retrieval in a data storage system that may be subject to one or more constraints on IOPS. Such techniques may provide advantages in various circumstances, such as in cases where users of a data storage system are not overly sensitive to retrieval time, such as the case for backup and archival data storage systems. In various embodiments, random read requests may be fulfilled using sequential reads as will be described in more details below.

As described herein, sequential reads access locations on a data storage device in a contiguous manner whereas random reads access locations on the data storage device in a non-contiguous manner. A read data size refers to the size (e.g., 4 KB) of data read by a read operation. For example, using logical block addressing (LBA), a series of sequential reads may read data located at LBA0, LBA2, LBA4 and so on, assuming a logical data block size of 512 bytes and a read data size of 1024 bytes. On the other hand, random reads access data in a non-contiguous manner. For example, a series of random reads may access data located at LBA6, LBA10, LBA0, and so on.

In an embodiment, a data storage system may receive one or more read requests to read data stored in the data storage system. Such read requests may come from the same or different customers. Each read requests may specify a set of data to be retrieved. In some instances, fulfillment of such requests may involve random read operations to be performed by the data storage system because the data requested may not be located in consecutive data storage areas. Examples of such read requests may include requests for relatively small data objects such as a shipping address, customer phone number, and the like. In other instances, read requests may involve sequential reads for one or more contiguous portions of data stored in the data storage system. Examples of such read requests may include requests for the content of a large archival file such as a novel.

Random reads are generally less efficient in terms of IOPS than sequential reads at least partially due to the physical constraints of data storage devices, such as seek time for an HDD. Specifically, reading a set of data randomly may take more I/O operations than that required to read the same set of data if the data were stored sequentially. Accordingly, methods described herein may be used to improve IOPS efficiency by sequentially reading data that includes data requested by random read requests. In an illustrative embodiment, a data storage device is read sequentially according to a schedule (e.g., every two days) to allow reading of all data stored in the data storage device. In this case, any requests to read any random subset of data stored in the data storage device may be read in no longer than the period between the full sequential reads (e.g., two days). As described above, such methods may be suitable for data storage systems where customers are not very sensitive to response time for data retrieval requests, for example, in exchange for lower storage costs. Examples of such data storage systems may include certain data backup and archival data storage systems.

Various methods may be used to reduce the amount of sequential reads as described herein. For example, instead of sequentially reading a whole data storage device such as an HDD, one or more portions of the data storage device may be sequentially read based on data locality information and/or predictions. In general, a data store system may include various data storage zones based on data locality and sequential reads may be limited to only certain subset of the data storage zones.

As used herein, a data storage zone may include one or more portions of data stored in one or more data storage entities, where the one or more portions of data may be sequentially read. Data storage entities may include data storage devices (such as tape drives, hard disk drives, solid state devices (SSD), and the like), data storage nodes or servers, datacenters and the like. Such data storage entities may be physical, virtual or any abstraction thereof (e.g., instances of distributed storage and/or computing systems) and may be organized into any topology, including hierarchical or tiered topologies.

As described above, a data storage zone may include the one or more data storage entities, portions from one or more data storage entities, and the like. For example, a data storage zone may include a portion of a data storage entity such as a sector, a platter or even a side of a platter of a HDD. As another example, a data storage zone may include an HDD or a rack of HDDs. In some embodiments, data storage zones may correlate to the physical characteristics of data storage entities such as the geometry, data density or capacity and hardware failure characteristics associated with a data storage device. Furthermore, such data storage zones may be based at least in part on past or predicted data access patterns, customer or system requirement such as data redundancy and fault tolerance requirement, and other factors. Such data storage zones may be delineated by logical (e.g., LBA addresses) or physical boundaries (e.g., separation of platters, drives, racks of drives, and the like). Such logical or physical boundaries of data storage zones may be predetermined and/or adjusted over time, for example, to account for changes to characteristics and factors described above.

Data requested by read requests may fall into one or more data storage zones. In other words, a data storage zone may have zero or more pending read requests associated with the data storage zone. In some embodiments, data retrieval requests may specify, directly or indirectly, the data storage zones used to service the requests. For example, in an embodiment, a data retrieval request includes a self-describing data object identifier that encodes an indication (e.g., volume identifier) of a data storage zone (e.g., volume) associated with the requested data. In some other embodiments, a data storage system may map data requests to data storage zones based on the data retrieval requests. In some embodiments, multiple data retrieval requests may be mapped to one data storage zone. For example, multiple requested data objects may reside in the same HDD, which may be part of a data storage zone. In other embodiments, a data request may be associated with multiple data storage zones. For example, data may be redundantly-encoded and stored in multiple data storage entities such as data storage devices, servers and datacenters.

In some embodiments, data storage zones with pending read requests may be sequentially read to obtain data requested by the pending read requests. In various embodiments, sequential reading of data storage zones may start at the same or different (staggered) locations and at the same or different (asynchronous) time. For example, the starting position of a sequential read may be predetermined or otherwise predictable (e.g., LBA0) for a given set of data storage zones. For another example, the starting position of a sequential read may be randomly picked (e.g., the current disk head position) for a given data storage zone.

In some embodiments, sequential reads of data storage zones may start and/or finish according to a schedule or randomly. For example, the start time of a data storage zone may be determined based at least in part on a power management schedule where data storage devices are turned active (e.g., spin up) or inactive (e.g., spin down) to conserve power and cooling costs. In another instance, the start time of sequential read for a data storage zone may correlate to data access patterns. For example, a sequential read for a data storage zone may start round the time when read requests are likely to hit the data storage zone, for example, based on analysis of past data access patterns. In some embodiments, sequential reads of data storage zones may continue until all remaining data in the data storage zones have been read. In some other embodiments, sequential reads of data storage zones may continue until data for pending read requests have been read. In yet some other embodiments, the sequential reads of one data storage zone may correlate to sequential reads of one or more other storage zones. For example, the starting position and time of a sequential read for a data storage zone may dynamically adjusted based on the sequential reads of other data storage zones. For example, a data storage zone selected for sequential read may be partially read or not be read at all if it is determined that sufficient data has been collectively retrieved from this and/or other data storage zones.

In some embodiments, data may be redundantly encoded into multiple data components (e.g., erasure-coded shards, replicas, and the like) which are stored in different data storage entities or different parts of the same data storage entity. Typically, in such embodiments, a minimum number of data components (i.e., a read quorum) may be required in order to restore the original data. In such embodiments, retrieval time associated with the data components may be shortened by the fact that sequential reads of data storage zones associated with the data components may stop as soon as a read quorum of data components has been received. Some of the data storage zones may not even need to be read at all. For example, assume that a data object is redundantly encoded by a 10×5 erasure code where data is encoded into ten data components, five of which are required to reconstruct the data object. Further assuming even distribution of the data components in the data storage zones, the average retrieval time for the data object may be half of the total time to sequentially read all the data storage zones associated with the data components since only five out often data components are needed to reconstruct the data object. Likewise, in an embodiment where the data components are stored in different parts of the same data storage device, the average time for retrieval may be similarly reduced to half of the time for a full sequential read of the data storage device. In general, in an erasure-code system with a stretch factor of x (e.g., 10/5 or 2 in this example), the average retrieval time may be reduced to 1/x of the time to perform a full sequential read.

In some embodiments, each sequential read operation may read a chunk of data where the size of the chunk (i.e., read data size) may be determined to optimize performance characteristics of the data storage system such as IOPS. In some embodiments, read data size may be determined based at least in part on hardware characteristics of data storage devices, available computing resources, IOPS constraints and the like. Further, read data size may be evolve (e.g., increase) over time, for example, due to new data storage technologies. In most embodiments, sequential read data size is larger than random read data size to improve efficiency. To illustrate the difference, consider a random read data size of 2 KB (i.e., each read operation reads a 2 KB data object) with 40 IOPS for random reads. Further assume sequential read data size is 2 MB with 20 IOPS for sequential reads. Thus, random reads yield 80 KB data per second with 40 I/O operations whereas sequential reads yield 80 MB data per second with 20 I/O operations. Accordingly, if the 80 MB sequentially-read data, on average, includes at least half of the 80 KB (or 40 KB) random-read data, sequential reads is at least as efficient as the random reads. In other words, in this case, if data read by a sequential read on average includes more than two randomly-read data objects, then sequential reads are more efficient than random reads in terms of IOPS usage (i.e., reading more data objects and hence servicing more read requests with a given IOPS). In some embodiments, sequential read data size may be determined and adjusted over time based on data read patterns, hardware characteristics and the like.

In some embodiments, sequentially-read data may be filtered or otherwise processed to retrieve desired data to service random read requests. In various embodiments, such processing may be performed by various data storage entities in a data storage system. For example, in an embodiment, sequentially-read data may be stored in a relatively high-performance data storage with smaller capacity such as memory or SSD attached to a data storage device or server. Further, a processor may be used to monitor data read into the high-performance data storage, for example, unwanted data may be discarded until the desired data is read. It is contemplated that in an embodiment, such processing/filtering may be performed close to the source of the data to achieve efficiency. For example, in an embodiment, such processing may be performed by firmware of a disk's internal controller. In some embodiments, post-processing may be performed on retrieved data before the data is provided to requesting customers. For example, redundantly encoded data components may be decoded (e.g., redundantly decoded, encryption, and the like) to restore the original data object. For another example, the integrity of retrieved data may be validated (e.g., using a digest) before the data provided to a customer.

FIG. 1 shows a diagram 100 illustrating data retrieval, in accordance with at least one embodiment. In this example, one or more data storage entities 102 receive a plurality of random read requests 104 for data objects in the data storage entities 102. In response to or independently of the read requests, the data storage entities 102 may sequentially read some or all data stored in the data storage entities 102 including the requested data objects. Based on the sequentially-read data, data 106 requested by random read requests may be provided. For example, in an embodiment, the sequentially-read data for a data storage entity may include requested data as a subsequence as well as unrequested data before and/or after the subsequence. In such an embodiment, the subsequence of data may be selected from the sequentially-read data while the unrequested data may be ignored.

Figure 2:
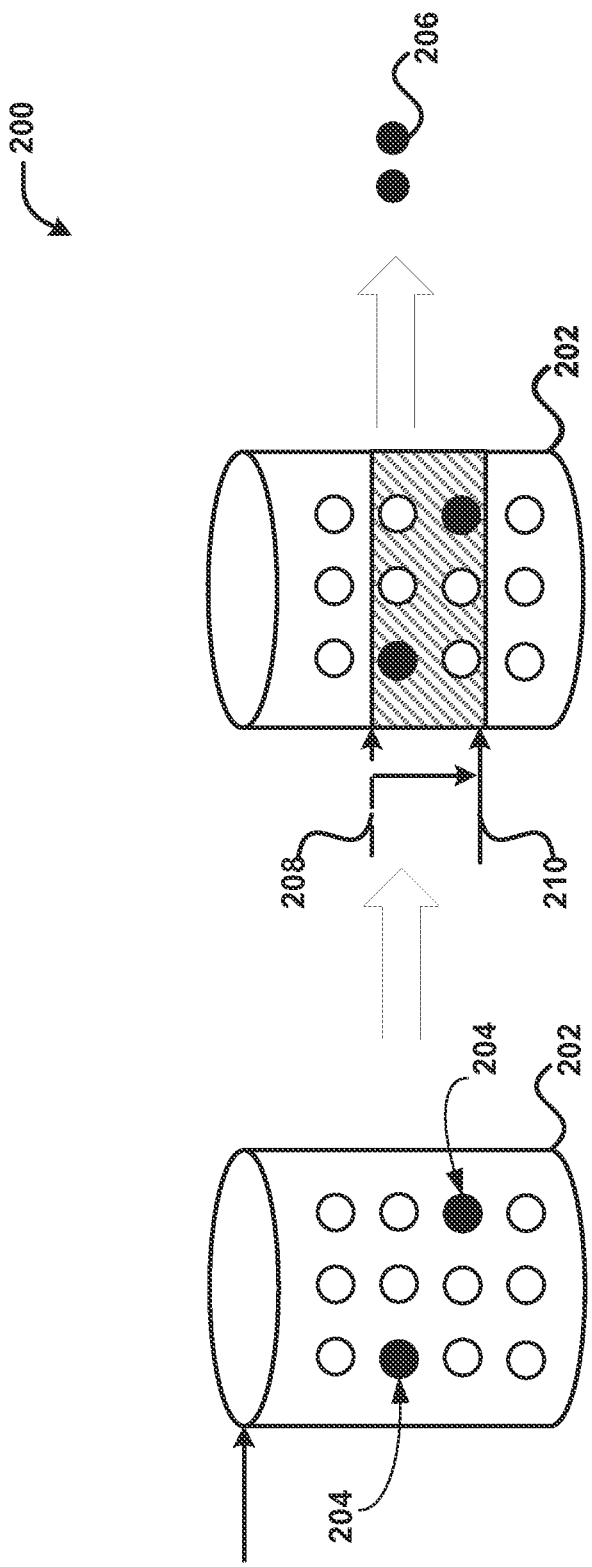
FIG. 2 shows a diagram illustrating data retrieval, in accordance with at least one embodiment.

FIG. 2 shows a diagram 200 illustrating data retrieval, in accordance with at least one embodiment. Similar to FIG. 1, in this example, one or more data storage entities 202 receives a plurality of random read requests 204 for data objects stored in the data storage entities 202. However, in this example, only a portion of data stored in a data storage entity 202 may be sequentially read. Such sequentially-read portion of data is delineated by start location 208 and end location 210 and includes data requested by random read requests 204. In some embodiments, the start location 208 and/or end location 210 may include predetermined data storage locations. In other embodiments, the start location 208 and/or end location 210 may be determined based at least in part on data locality of random read requests 204. For example, random data requests 204 may be analyzed to determine a region that can be sequentially read and that includes the requested data. For example, in an embodiment, a read request for a data object encodes an indication of a volume identifier that identifies the volume where the data object is stored. Assuming one or more volumes are located in a data storage entity, if two read requests are directed to the same volume on the data storage entity, then that particular volume instead of all data on the data storage entity may be sequentially read to retrieve the requested data objects 206. In some embodiments, the start location 208 may be predetermined (e.g., LBA100 or start of the volume) and the end location 210 is determined based on when the requested data objects are read. For example, sequential reads may end after the requested data objects 206 have been read.

Figure 3:
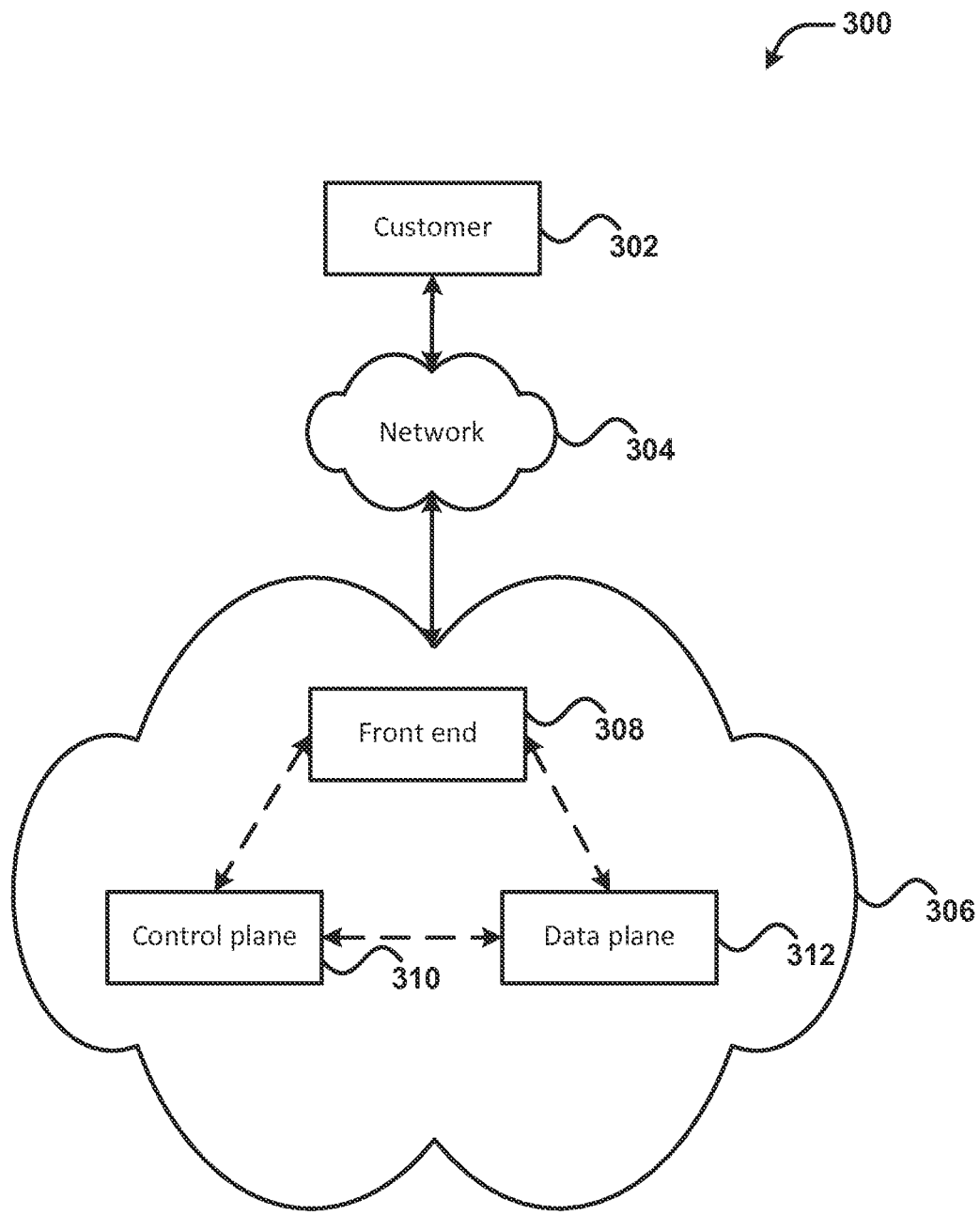
FIG. 3 illustrates an example environment for implementing aspects in accordance with at least one embodiment.

FIG. 3 illustrates an example environment 300 for implementing aspects in accordance with at least one embodiment. One or more customers 302 connect, via a network 304, to data storage system 306. As implied above, unless otherwise clear from context, the term "customer" refers to the system(s) of a customer entity (such as an individual, company or other organization) that utilizes data storage services described herein. Such systems may include datacenters, mainframes, individual computing devices, distributed computing environments and customer-accessible instances thereof or any other system capable of communicating with the archival data storage system. In some embodiments, a customer may refer to a machine instance (e.g., with direct hardware access) or virtual instance of a distributed computing system provided by a computing resource provider that also provides the data storage system. In some embodiments, the data storage system is integral to the distributed computing system and may include or be implemented by an instance, virtual or machine, of the distributed computing system. In various embodiments, network 304 may include the Internet, a local area network ("LAN"), a wide area network ("WAN"), a cellular data network and/or other data network.

In an embodiment, data storage system 306 provides a multi-tenant or multi-customer environment where each tenant or customer may store, retrieve, delete or otherwise manage data in a data storage space allocated to the customer. In some embodiments, a data storage system 306 comprises multiple subsystems or "planes" that each provides a particular set of services or functionalities. For example, as illustrated in FIG. 3, data storage system 306 includes front end 308, control plane 310, and data plane 312. Each subsystem or plane may comprise one or more components that collectively provide the particular set of functionalities. Each component may be implemented by one or more physical and/or logical computing devices, such as computers, data storage devices and the like. Components within each subsystem may communicate with components within the same subsystem, components in other subsystems or external entities such as customers. At least some of such interactions are indicated by arrows shown in FIG. 3.

The front end 308 may implement a group of services that provides an interface between the data storage system 306 and external entities, such as one or more customers 302 described herein. In various embodiments, front end 308 may provide an application programming interface ("API") to enable a user to programmatically interface with the various features, components and capabilities of the data storage system. Such capabilities may include data storage, data retrieval, metadata queries, configuration of various operational parameters, and the like. The front end 308 may also provide customer authentication, customer authorization, usage metering, and billing-related functions. Additionally, in some embodiments, the front end services may include an ingress and egress point for all data flowing into and out of the data storage system, e.g., to and from customers.

The control plane 310 may provide services that create, track and manage jobs created as a result of customer requests. As used herein, a job refers to a customer-initiated activity that may be performed asynchronously to the initiating request, such as data retrieval, storage, metadata queries or the like. For example, a data retrieval job may be created in response to an asynchronous data retrieval request and the data retrieval job may be asynchronously processed using, for example, methods described herein. In some embodiments, jobs allow a data storage system to plan and optimize the processing of data requests using techniques such as batch processing, request coalescing and the like, in order to provide lower storage costs for customers. Control plane 310 may also provide a queue-based load leveling service to dampen peak to average load levels (jobs) and to deliver manageable workload to data plane 312. Finally, control plane 310 may provide transient data storage services for payload data transiting between front end 308 and data plane 312. Such payload data may include incoming data pending storage and outgoing data pending customer download.

The data plane 312 may provide storage-related services such as data storage, retrieval and deletion, anti-entropy operations and the like. Entropic effects include, but are not limited to, performance degradation due to data fragmentation resulting from repeated write and rewrite cycles, hardware wear (e.g., of magnetic media), data unavailability and/or data loss due to hardware malfunction, environmental factors, physical destruction of hardware, random chance, or other causes. The data plane 312 may detect such effects and in some embodiments may preemptively and/or reactively institute anti-entropy correction routines and/or policies.

Figure 4:
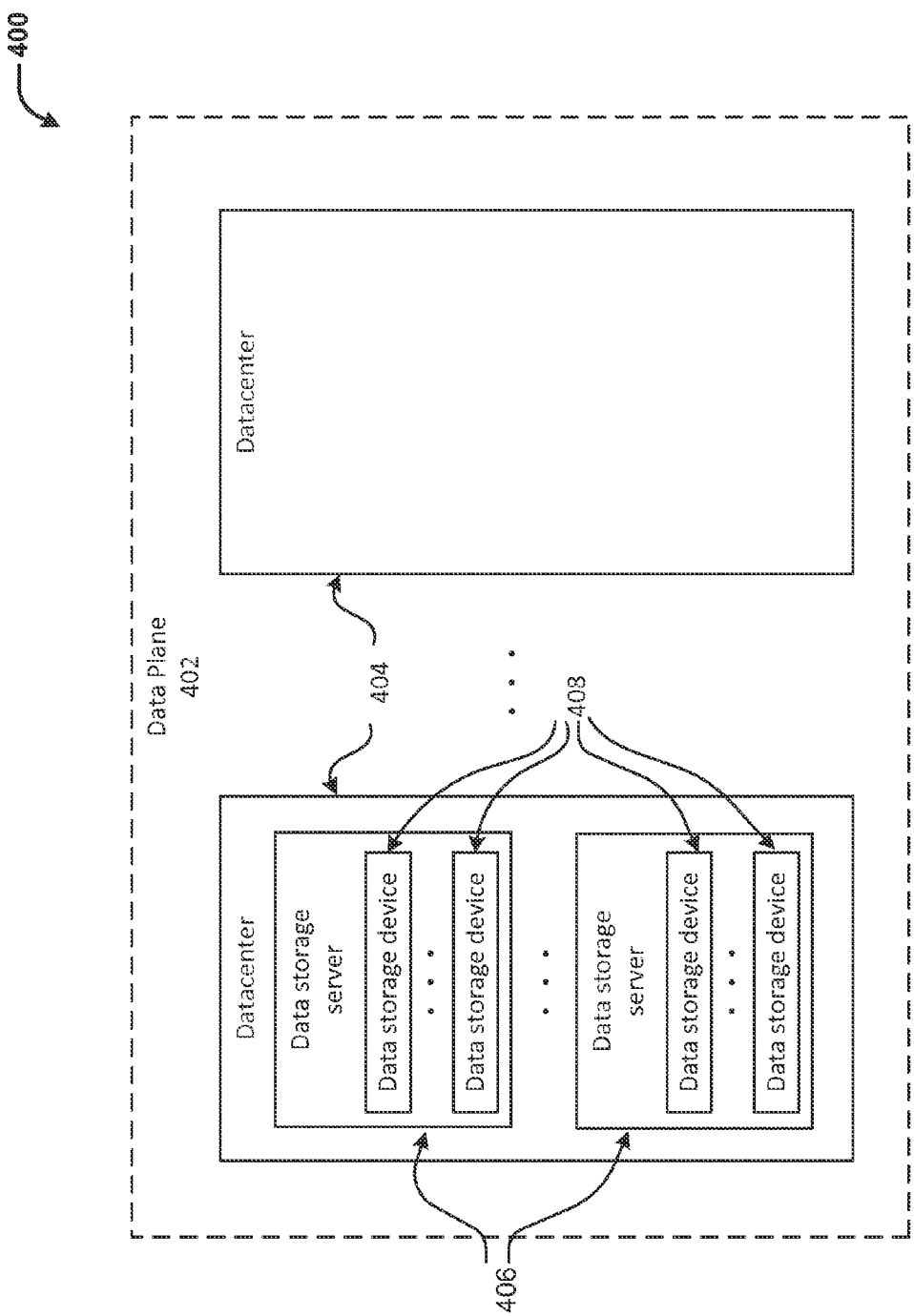
FIG. 4 illustrates an example hardware topology for a data storage system in which the techniques described herein may be applied.

FIG. 4 illustrates an example hardware topology 400 for a data storage system in which the techniques described herein may be applied. A data plane 402, similar in some embodiments to the data plane 312 described in connection with FIG. 3, includes a one or more datacenters 404. Each datacenter may be a facility, which may have its own postal address, and which may comprise one or more storage servers 406, which in turn each include one or more data storage devices 408. The datacenters may, in some embodiments, be configured similarly to one another, or may contain differing numbers and/or types of constituent devices. Similarly, the storage servers and/or the data storage devices may be uniform, tiered, differentiated or any combination thereof. For example, the data storage devices, storage servers and/or datacenters may be organized in a differentiated fashion (e.g., by price, performance, capacity, and/or function), such as would be the case in a typical hierarchical ("tiered") storage system. Such a hierarchical storage system may automatically move data between relatively higher-cost, higher-speed data storage devices and relatively lower-cost, lower-speed data storage devices within the data plane.

As an alternative example, a simpler storage system may utilize a data plane wherein the various devices, servers and/or datacenters are substantially similar in price, performance, capacity and/or functional attributes. As may be contemplated, data storage devices may include any media capable of storing data and in any configuration, including solid state storage devices (SSDs), conventional electromechanical hard disk drives, hybrid hard disk drives, shingled magnetic recording hard drives, optical media, optoelectrical media, magneto-optical media, and tape drives. In various embodiments, datacenters, storage servers and data storage devices may be physical, virtual, or any abstraction thereof (e.g., instances of distributed storage and/or computing systems). Similarly, the components of the data plane may be dispersed, local or any combination thereof. Any of the exemplary storage system configurations described herein, as well any other storage system configuration or combination, may benefit from the various techniques described herein.

Figure 5:
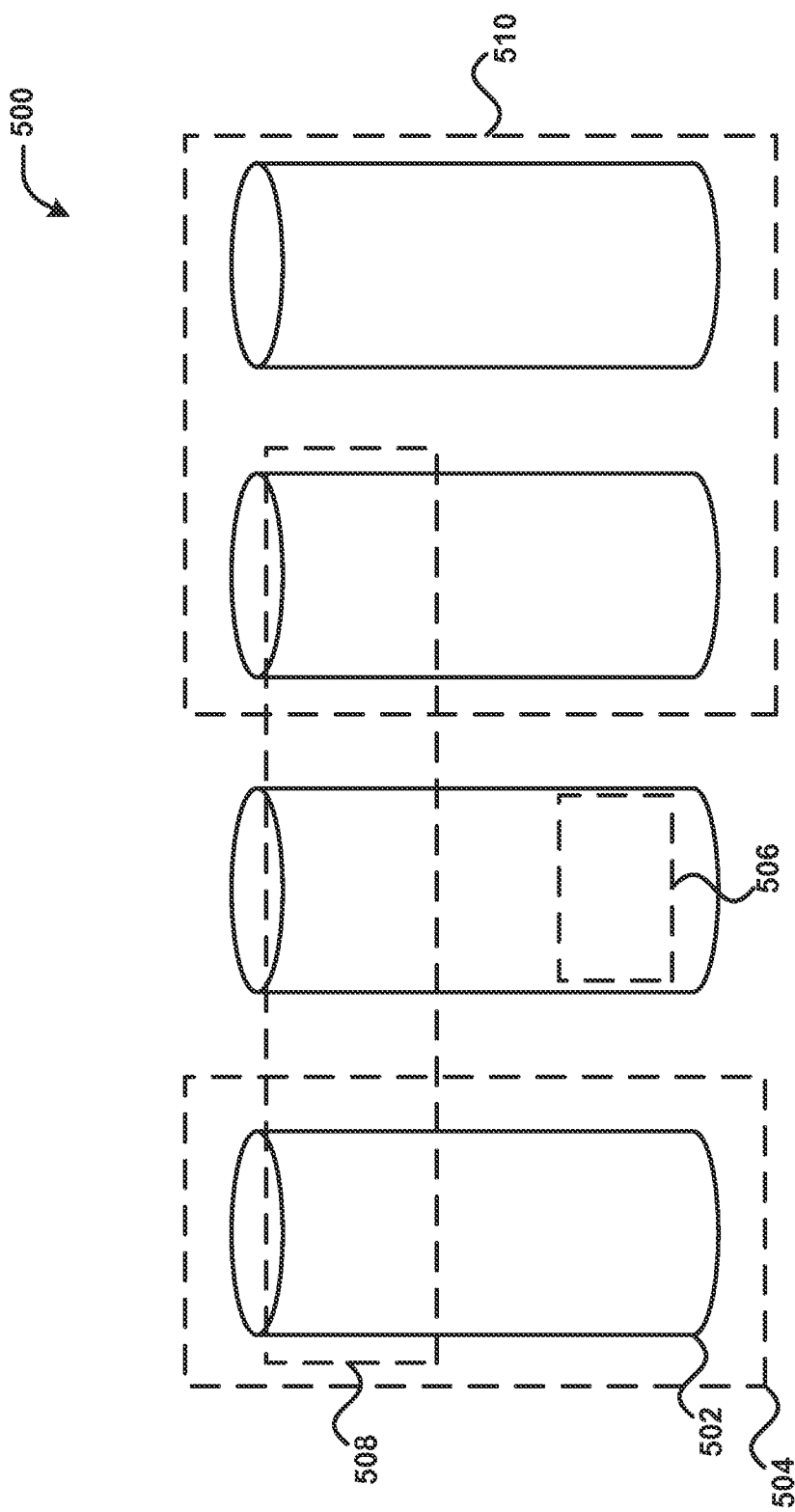
FIG. 5 shows a diagram illustrating data storage zones, in accordance to at least one embodiment.

FIG. 5 shows a diagram 500 illustrating data storage zones, in accordance to at least one embodiment. As described above, a data storage zone may include one or more portions of data stored in one or more data storage entities 502, where the one or more portions of data may be sequentially read. Data storage zones may be used, in some embodiments, to limit the amount of sequential reads performed according to the methods described herein. Data storage entities 502 may be similar to data storage entities described above in connection with FIG. 4.

In some embodiments, a data storage zone may include a portion 506 of a data storage entity 502. For example, such data storage zone may include a sector of a disk, a platter or a side of a platter of a disk or any continuous storage of a data storage device. In some other embodiments, a data storage zone may include a data storage entity 504 as a whole. For example, a data storage zone may include a data storage device such as an HDD. Further, a data storage zone may also include a plurality of data storage entities 510 such as a rack of data storage devices. In some other embodiments, a data storage zone may span portions 508 of multiple data storage entities. For example, a data storage zone may include a logical volume comprised of one or more volume components stored in one or more data storage entities. In an embodiment, a data storage zone may include subzones that may or may not correlate to hardware topology of the data plane as described in connection with FIG. 4. In various embodiments, a data storage zone may include other variations of the embodiments described above or combinations thereof.

In some embodiments, data storage zones may correlate to the physical characteristics of data storage entities such as geometry of a disk, data density or capacity, hardware failure characteristics and the like. Furthermore, such data storage zones may be based at least in part on past or predicted data access patterns, customer or system requirement such as data redundancy and fault tolerance requirement, and other factors. Such data storage zones may be delineated by logical (e.g., LBA addresses) or physical boundaries (e.g., separation of platters, drives, racks of drives, and the like). Such logical or physical boundaries of data storage zones may be predetermined and/or adjusted over time to account for changes to characteristics and factors described above. In particular, the size of a data storage zone may be determined based on a number of factors such as data storage density, data read size, IOPS constraints, predicted data access patterns and the like. For example, the size of a data storage zone may increase as data storage technologies allow larger and faster sequential data reads. For another example, the number of data storage zones may be limited to allow efficient indexing of the data storage zones, discussed below.

In some embodiments, a data storage system may maintain an index or mapping of data storage zones within the data storage system. Such a map may be used to determine which data storage zone(s) store data requested by a given read request. In various embodiments, multiple mappings may be used to determine the data storage zones or subzones that store the requested data. For example, in an embodiment, a data storage system maintains a mapping between volumes and storage nodes or storage servers that host the volumes. Further, a storage node or storage server may maintain a mapping between volumes and data storage devices that store the volumes. In some embodiments, such index or mapping of data storage zones may be stored or loaded into memory or SSD to provide efficient lookup.

Figure 6A:
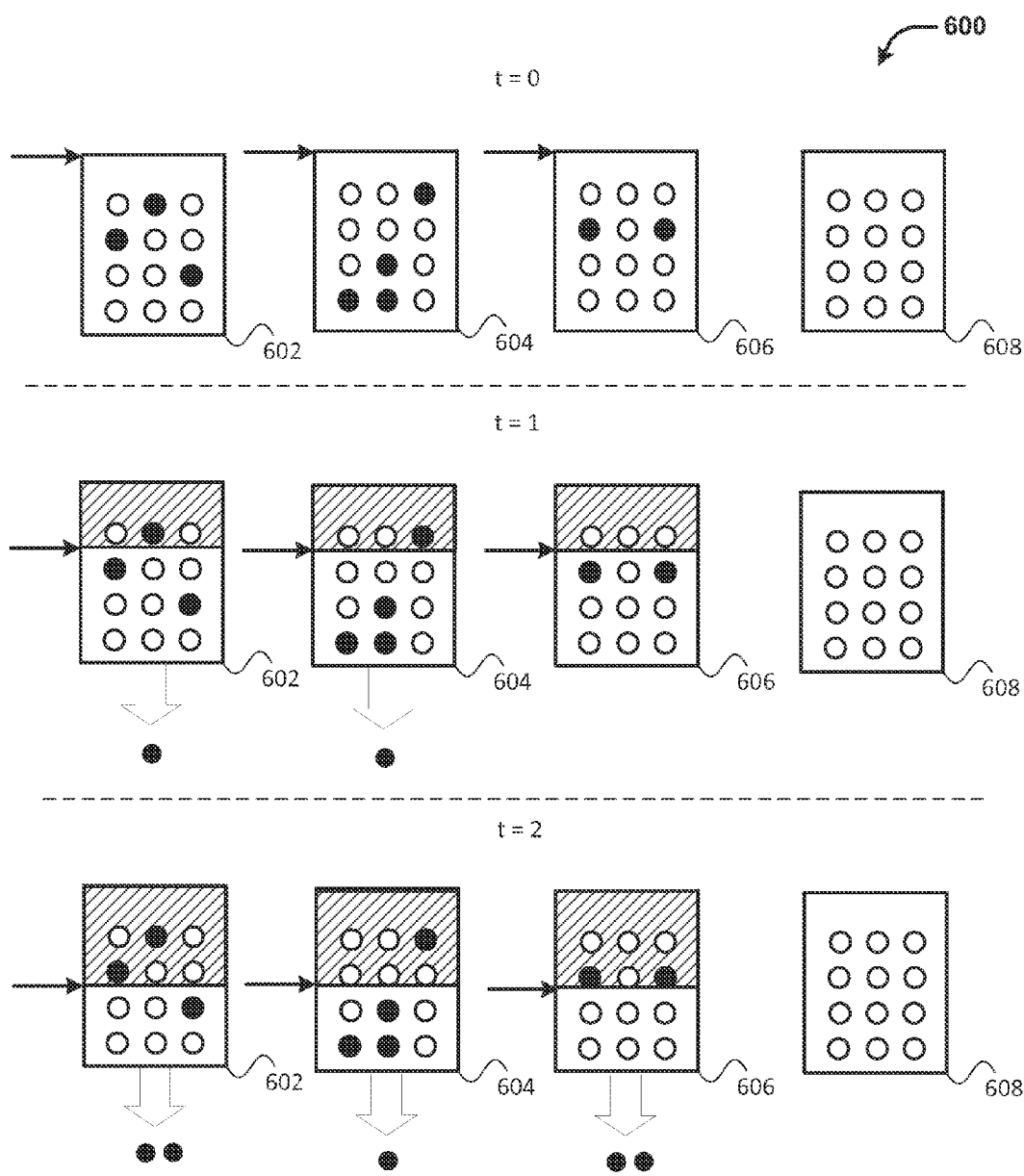
FIG. 6a shows the first part of a diagram illustrating retrieval of data, in accordance with at least one embodiment.
Figure 6B:
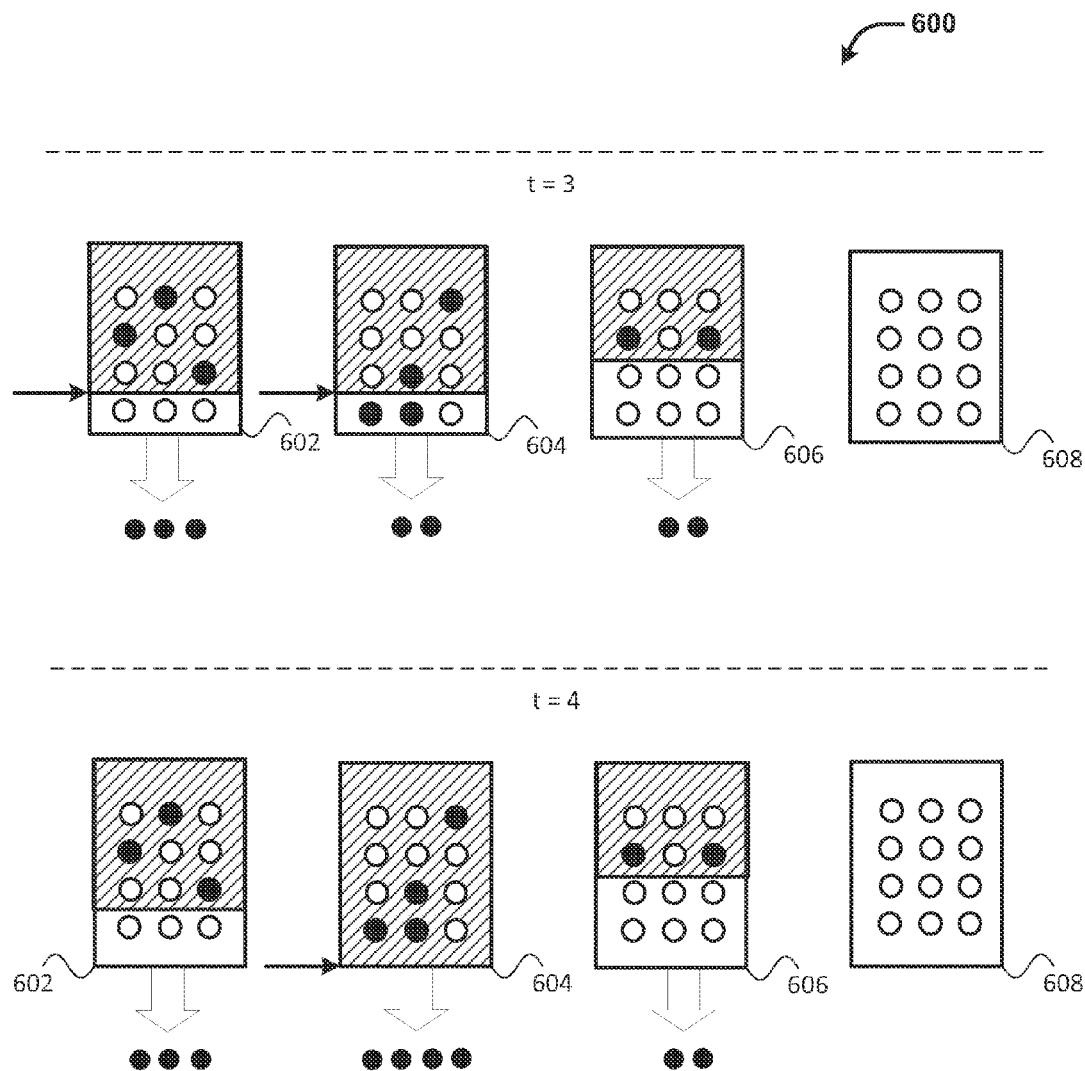
FIG. 6b show the second part of a diagram illustrating retrieval of data, in accordance with at least one embodiment.

FIGS. 6a and 6b together show a diagram 600 illustrating retrieval of data, in accordance with at least one embodiment. In this example, data storage zones 602, 604 and 606 each includes data objects (denoted in black) requested by incoming read requests, whereas data storage zone 608 does not include any requested data objects. As described above, data storage zones may include a portion of a data storage device, a data storage device or a combination thereof. Starting with FIG. 6a, beginning at time t=0, data stored in data storage zones 602, 604 and 606 may be read sequentially while data storage zone 608 may not be sequentially read since it does not include any requested data. In other embodiments, data stored in data storage zone 608 may be sequentially read according to a periodic schedule regardless of whether there are pending reads for the data storage zone. As described above, the starting location and/time for the sequential reads across various data storage zones may be synchronized or staggered. As illustrated by FIG. 6a, beginning at time t=1, sequential reads for data storage zones 602 and 604 may each yield one of the requested data objects while sequential reads for data storage zone 606 may not yield any requested data object yet. Beginning at time t=2, sequential reads for data storage zones 602 may continue to yield requested data object, while sequential reads for data storage zones 604 may not yield anything useful. Further, sequential reads for data storage zones 606 may start producing requested data.

Continuing with FIG. 6b, beginning at time t=3, the sequential reads for data storage zone 606 may have stopped because all requested data objects included in the data storage zone 606 have been retrieved. In other embodiments, sequential reads may continue for an arbitrary period of time (e.g., until the remaining data in the data storage zone has been read). Meanwhile, sequential reads for data storage zones 602 and 604 may continue to yield requested data objects. Beginning at time t=4, the sequential reads for data storage zone 602 may have stopped because all requested data objects included in the data storage zone 602 have been retrieved. On the other hand, sequential reads for data storage zone 604 may continue until all data stored in the data storage zone has been read.

As discussed above, in some embodiments, data may be redundantly encoded into multiple data components, which are stored in different data storage entities or different parts of the same data storage entity. Data redundancy encoding schemes may include erasure codes, replicas, forward error-correction codes and the like. Typically, in such embodiments, a minimum number of data components (i.e., a read quorum) may be required to be retrieved in order to restore the original data. In such embodiments, retrieval time associated with the data components may be shortened by the fact that sequential reads of data storage zones associated with the data components may stop as soon as a read quorum of data components has been received.

Figure 7:
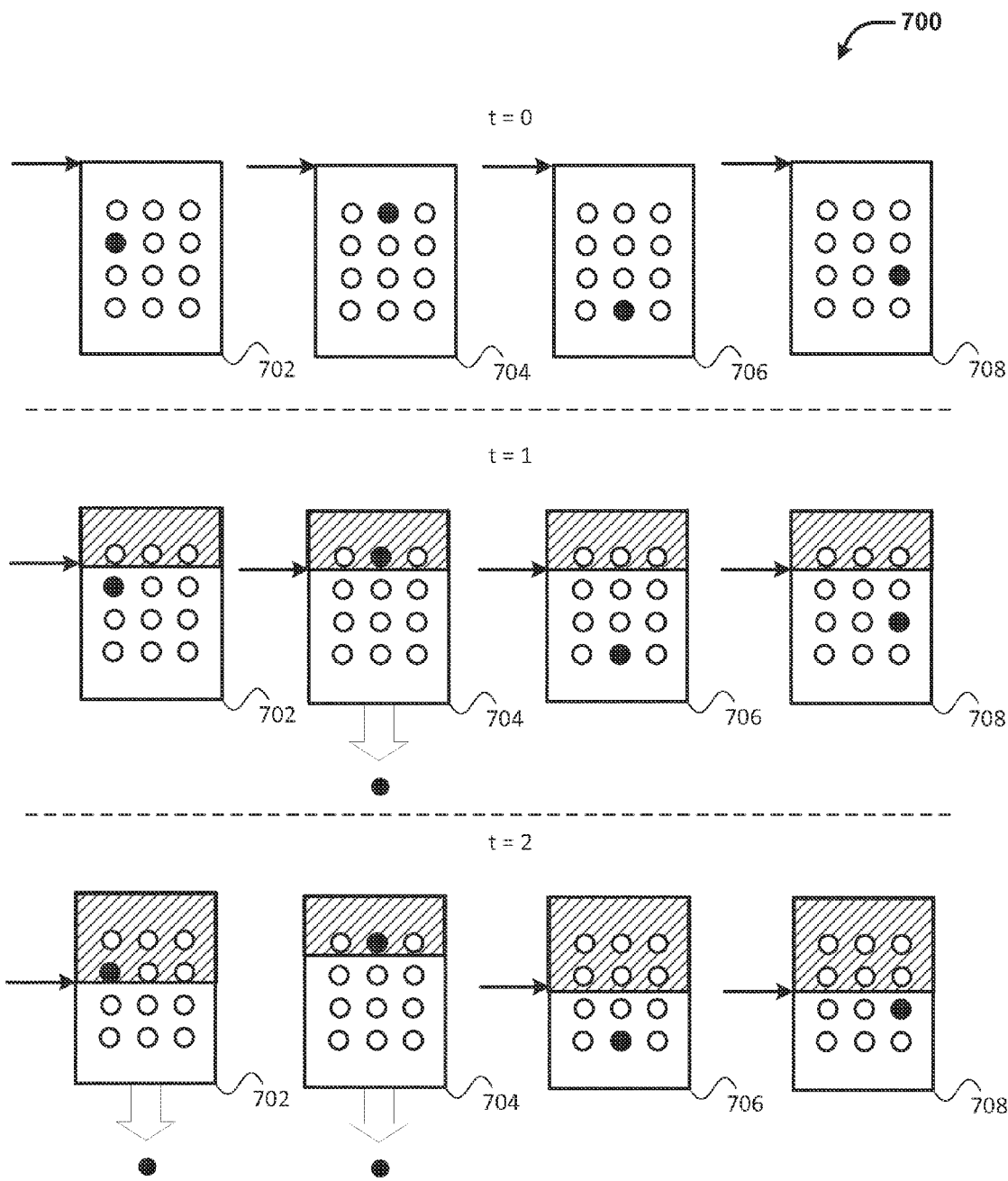
FIG. 7 shows a diagram illustrating the retrieval of data components associated with a data object, in accordance with at least one embodiment.

FIG. 7 shows a diagram 700 illustrating the retrieval of data components associated with a data object, in accordance with at least one embodiment. It is contemplated that while diagram 700 shows a request to read only one data objet, it is for illustrative purpose only. Typically, more than one data requests may be processed in batch, as illustrated in FIGS. 6a and 6b. In this example, requested data object is redundantly encoded into four data components that are stored in data storage zones 702, 704, 706 and 708, respectively. Two of the four encoded data components may be required to reconstruct the data object according to the data redundancy encoding scheme. In an illustrative embodiments, sequential reads for all four data storage zones start around the same time at time t=0 and from the same starting location (e.g., the beginning of the data storage zone). At time t=1, sequential reads for data storage zone 704 may have yielded one of the four encoded data components. Subsequently, sequential reads for data storage zone 704 may discontinue. As discussed above, in other embodiments, sequential reads for data storage zone 704 may continue for an arbitrary length of time. At time t=2, another data component may be produced by sequential reads of data storage zone 702. Subsequently, the two data components provided by data storage zones 702 and 704 may be used to reconstruct the data object before the data components in data storage zones 706 and 708 are retrieved, since only two out of four data components are required to reconstruct the data object. Thus, the retrieval time for the data object may be shortened. In various embodiments, sequential reads for any of the data storage zones may discontinue at this point or continue for an arbitrary length of time. In some embodiments, reconstruction may not start until more than the minimum number of data components has been retrieved.

Figure 8:
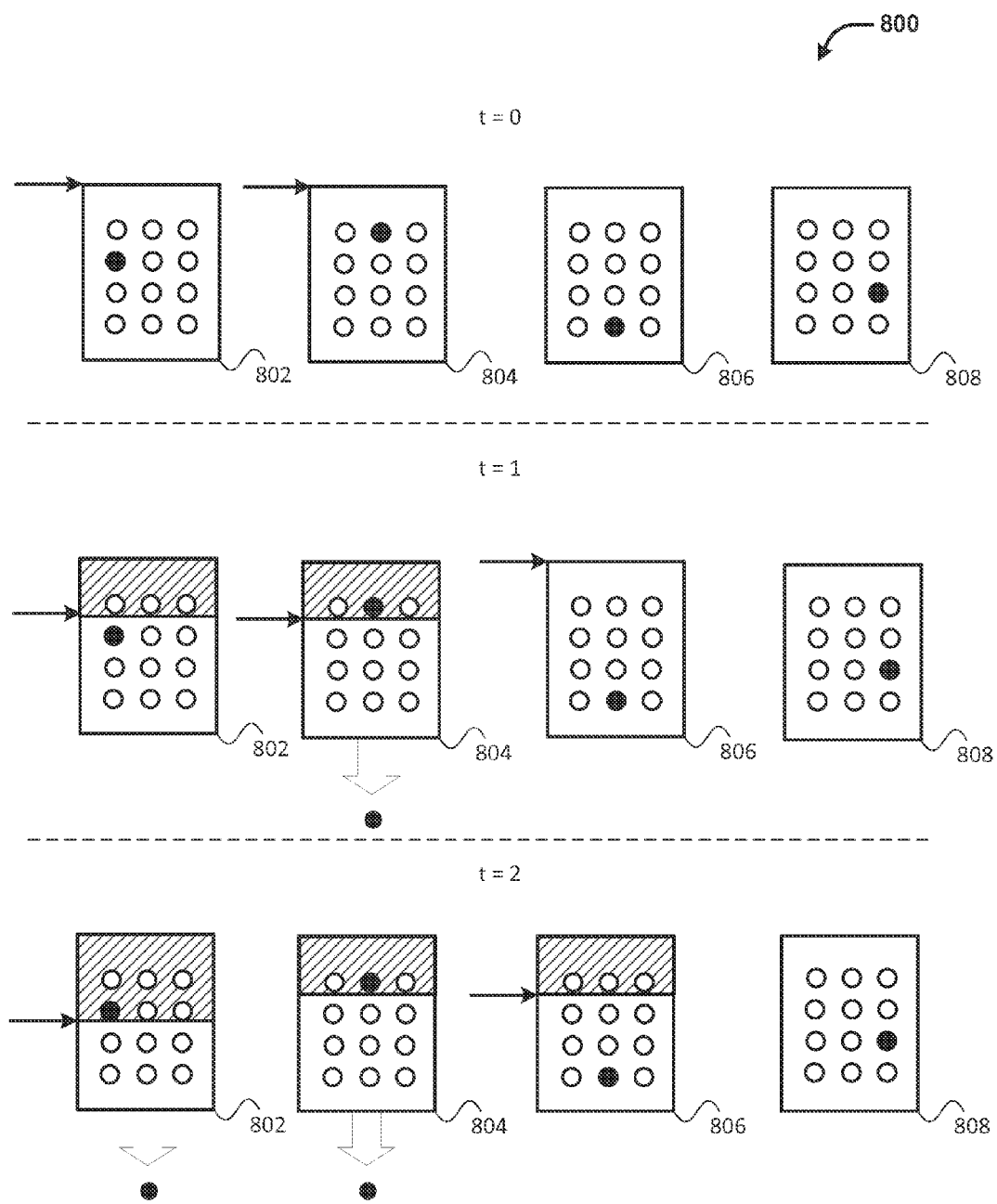
FIG. 8 shows a diagram illustrating the retrieval of data components associated with a data object, in accordance with at least one embodiment.

FIG. 8 shows a diagram 800 illustrating the retrieval of data components associated with a data object, in accordance with at least one embodiment. This example is similar to that shown in FIG. 7 except that the starting times for the sequential reads of the data storage zones are asynchronous. As illustrated, sequential reads for data storage zones 802 and 804 may start at time t=0 while the sequential reads for data storage zone 806 may start at time t=1. Further, sequential reads for data storage zone 808 may not start at all because by the end of t=2, the required two out of four data components have already been retrieved.

Figure 9:
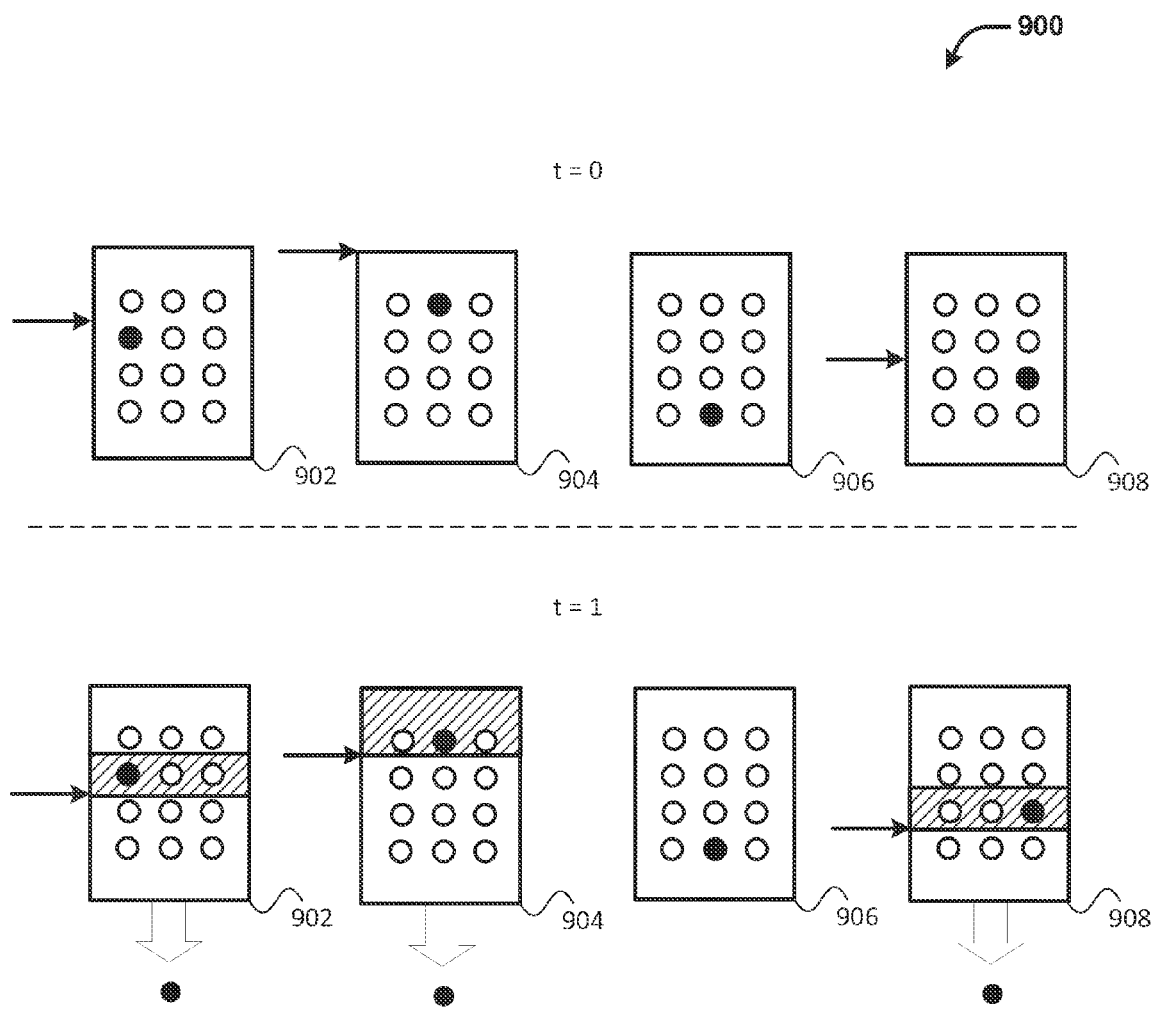
FIG. 9 shows a diagram illustrating the retrieval of data components associated with a data object, in accordance with at least one embodiment.

FIG. 9 shows a diagram 900 illustrating the retrieval of data components associated with a data object, in accordance with at least one embodiment. This example is similar to those shown in FIGS. 7 and 8 except that starting locations for the sequential reads of the data storage zones are staggered. In the illustrative example, sequential reads for data storage zone 904 starts at the beginning whereas sequential reads for data storage zones 902 and 908 start at different locations within the data storage zones. In some embodiments, the starting locations may be selected randomly or at predetermined locations such as based on locality of the data requested, data storage subzones, a round-robin algorithm and the like. As illustrated, by the end of time t=1, three out of the four data components are retrieved, two of which may be used to reconstruct the data object. Note that in this example, portions of a data storage zone or the entire data storage zone (such as data storage zone 906) may never be read. As discussed above, in various embodiments, either or both of starting time and starting location for sequential reads of data storage zones maybe the same or different.

Figure 10:
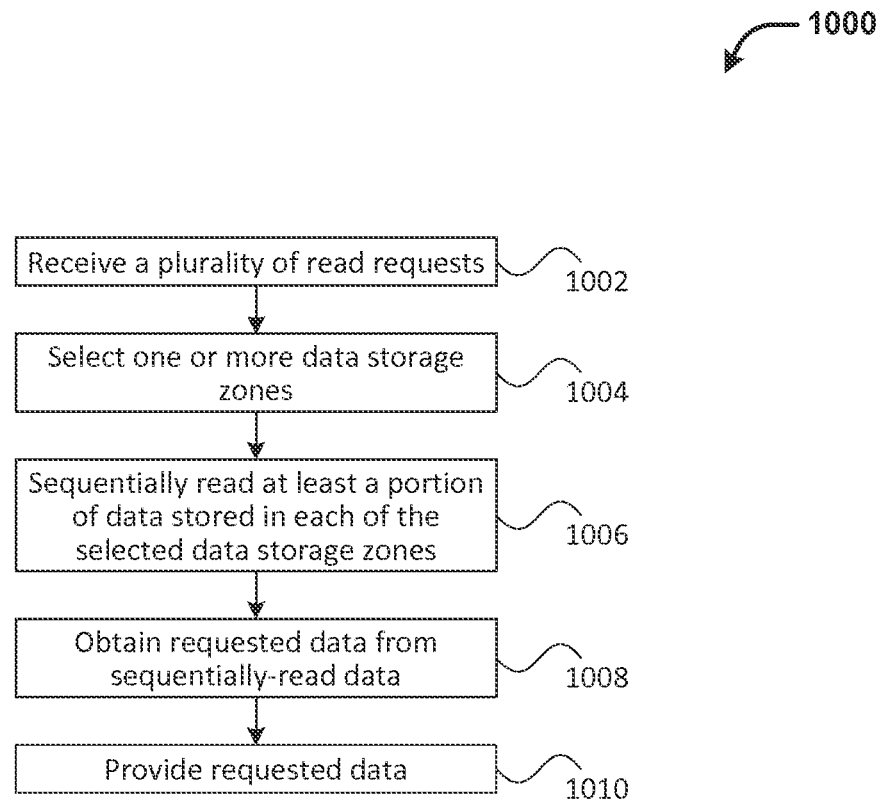
FIG. 10 illustrates a process for data retrieval, in accordance with at least one embodiment.

FIG. 10 illustrates a process 1000 for data retrieval, in accordance with at least one embodiment. Some or all of the process 1000 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored in a computer-readable storage medium, for example, in the form of a computer program comprising a plurality of instructions executable by one or more processors. The computer-readable storage medium may be non-transitory. In an embodiment, process 1000 may be performed by a data storage system as described in connection with FIG. 3 or a data plane and/or data storage entities as described in connection with FIG. 4.

In an embodiment, a system implementing process 1000 receives 1002 a plurality of read requests. Such read requests may be received by a data storage system from one or more customers described in connection with FIG. 3. In another embodiment, such requests may be received by a data plane from other components within a data storage system. Each read request may specify a set of data to be retrieved. In some embodiments, a read request may encode storage location information such as an identifier or physical or logical address of the data to be retrieved. In the illustrative embodiment, the system implementing process 1000 may process multiple read requests in a batch to gain efficiency. Alternatively, the system may process read requests one at a time.

The system implementing process 1000 may select 1004 one or more data storage zones for sequential reads. Such one or more data storage zones may be selected from a plurality of data storage zones. For example, 500 out of 1000 volumes stored in a data storage device may be selected, where each volume is a data storage zone. As another example, three out of ten HDDs in a rack of HDDs may be selected where each HDD is a data storage zone. As discussed above, data storage zones may include a portion of a data storage entity, a data storage entity or a combination thereof. In some embodiments, the system may determine the data storage zones based on the read requests. For example, the read requests may include storage location information (such as an identifier or a path) which may be used by the system to look up an index or a map of data storage zones. In some embodiments, multiple lookups may be required to determine the data storage zones or subzones that include the requested data.

In some embodiments, the data storage zones may be selected 1004 independently of the read requests. For example, the data storage zones may be selected based at least in part on statistically modelable or predictable read patterns. For example, if data located in a particular data storage zone is likely to be hit during a particular time period based on historical data read patterns, then that data storage zone may be sequentially read during the particular time period. As another example, the data storage zones may be selected based at least in part on a schedule that is independent of read requests. Such a schedule may include, for example, a round-robin-like schedule to sequentially read some or all data storage zones in the system. Such a schedule may be based on the time it takes to read a data storage zone, operational costs, availability of computing resources, performance requirements, service-level agreement and the like. In other embodiments, a data storage zone may be selected at random.

For each of the data storage zones selected above, the system implementing process 1000 may sequentially read 1006 at least a portion of data stored in the data storage zone. In some embodiments, some or all of the data storage zones may be sequentially read in entirety. In other embodiments, only a portion of data stored in some or all of the data storage zones may be read sequentially. As discussed above, some of the sequential reads for the data storage zones may be staggered and asynchronous with each other. For example, the sequential reading of a data storage zone may start and/or stop at any time with or without pause in between. Further, the sequential reads of the data storage zones may be performed in sequence, in parallel, or in a combination thereof. Some of the selected data storage zones may not be accessed or only partially accessed, for example, because sufficient amount of data has been retrieved as illustrated in FIGS. 7-9.

As described above, some or all of the sequentially-read data storage zones may be associated with data for pending read requests. In various embodiments, the sequentially-read data includes at least data associated with the pending read requests. In some embodiments, the requested data may be a proper subset of the sequentially-read data. For example, the sequentially-read data may include a subset of data that is not unnecessary for responding to the read requests.

In some embodiments, sequentially-reading 1006 a portion of data stored in a data storage zone includes transferring the portion of data to a temporary storage, such as memory or an SSD, that is operably connected to the data storage zone. In most cases, such temporary storage may provide faster data access than the data storage zone. For example, such temporary storage may be provided by a cache memory that is operably connected to a data storage server or data storage device.

As discussed above, each sequential read operation may read a chunk of data where the size of the chunk (i.e., read data size) may be determined to optimize performance characteristics of the data storage system such as IOPS. In some embodiments, read data size may be determined based at least in part on hardware characteristics of data storage devices, availability of computing resources (such as processing power, channel bandwidth, memory and the like), IOPS constraints and the like. In most embodiments, sequential read data size is larger than random read data size to improve efficiency. Further, read data size may be evolve (e.g., increase) over time, for example, under new data storage technologies. For example, as storage density and processing power increase, read data size may also increase.

In some embodiments, sequentially-read data may be filtered or otherwise processed to obtain 1008 desired data to service the read requests. In various embodiments, such processing may be performed by one or more processors that may be operably connected to one or more data storage zones and temporary storage where sequentially-read data is stored. It is contemplated that in an embodiment, the processing described herein may be performed close to the source of the data to achieve efficiency. For example, in an embodiment, such processing may be performed by firmware of a disk's internal controller.

In various embodiments, such processing may be performed for some or all of the data storage zones in sequence, in parallel, or in a combination thereof. In some embodiments, sequentially-read data may be processed as it is read into the temporary data storage. In such an embodiment, a processor may monitor data being read into the temporary data storage and discard at least some of the unrequested data until desired data has been read. In another embodiment, the temporary data storage may be large enough to hold most of the sequentially-read data and the desired data may be extracted after most of the sequential reads are completed.

In some embodiment, the system implementing process 1000 provides 1010 the requested data, for example, in one or more responses to the read requests. In some embodiments, data obtained above may be combined or otherwise processed before being provided 1010. For example, redundantly encoded data components may be decoded (e.g., redundantly decoded, encryption, and the like) to restore the original data object. For another example, the integrity of retrieved data may be validated (e.g., using a digest) before the data provided to a customer. In some embodiments, requested data may be streamed out shortly after at least a portion of the requested data becomes available. In other embodiments, requested data may be provided only after the all of the requested data is available.

Figure 11:
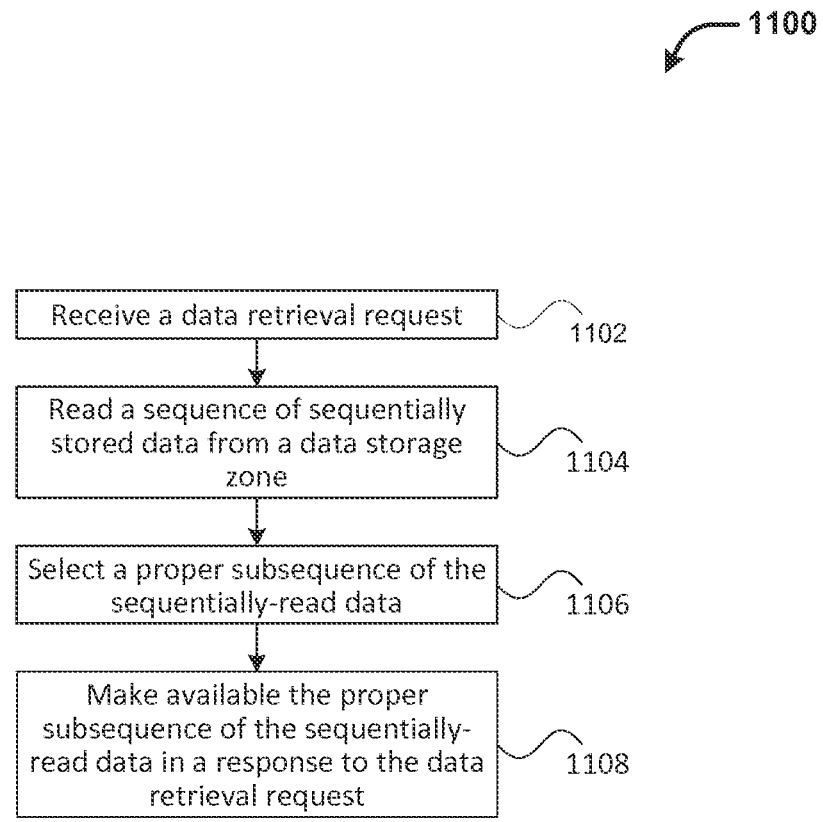
FIG. 11 illustrates a process for data retrieval, in accordance with at least one embodiment.

FIG. 11 illustrates a process 1100 for data retrieval, in accordance with at least one embodiment. Some or all of the process 1100 may be performed by a data storage entity that includes or is operably connected to a data storage zone, such as an HDD, a storage server and the like.

In an embodiment, a system implementing process 1100 receives 1102 a data retrieval request. In some embodiments, the data retrieval request may include one or more requests, control messages or commands from one or more entities that are internal or external to a data storage system, such as described in connection with FIG. 3. The data retrieval request may specify a set of data to retrieve from a data storage zone. In some embodiment, some of the set of data may not be contiguously or sequentially stored in the data storage zone.

In some embodiments, the data retrieval request may be handled by a data storage system in an asynchronous fashion in that the system may not provide the retrieved data right away. For example, in an embodiment such as discussed in connection with FIG. 3, the system creates a data retrieval job associated with a data retrieval request from a customer and provides the customer with a job identifier associated with the data retrieval job. The system may process the data retrieval job in connection with other pending jobs using job planning and/or optimization techniques such as batch processing, request coalescence and the like. Such processing may occur any time after the creation of the data retrieval job. Once the data retrieval job is processed, such as using the methods described herein, the retrieved data may be made available to the requesting customer. In various embodiments, the retrieved data may be provided to the customer using a push technology, a pull technology or a combination thereof. For example, a customer may learn of the completion of the data retrieval job by receiving a notification from the system or by polling the system with the job identifier. In an embodiment, the retrieved data may be provided in a temporary data storage and a customer may download the retrieved data from the temporary data storage by sending a synchronous download request. In response to the download request, the retrieved data may be transmitted to the customer. In another embodiment, the retrieved data may be pushed to the customer's device. In yet another embodiment, the retrieved data may be provided to a third party that may push the data to the customer or cause the customer to pull the data.

In response to or independently of the data retrieval request, the system implementing process 1100 may read 1104 a sequence of sequentially stored data from a data storage zone. The data storage zone may include a volume, a data storage device and the like. In some embodiments, all or a portion of data stored in the data storage zone may be read in a series of sequential read operations. Each of the sequential read operations may read a variable or fixed chunk of data. Such variable or fixed chunk of data may, in some embodiments, be configured to optimize performance characteristics such as IOPS, as described above.

In various embodiments, the reading of the sequence of sequentially stored data may be initiated based at least in part on an existing schedule, a request or message from another entity such as that in step 1102, or a combination thereof. For example, a data storage device may implements periodic sequential reads of data stored in the data storage device. As another example, a data storage device may perform sequential reads of a volume stored in the data storage device when there is a certain number of pending read requests associated with the volume.

The system implementing process 1100 may select 1106 a proper subsequence of the sequentially-read data described above. Such a proper subsequence of the sequentially-read data may include data used to fulfill a pending data retrieval request. In some embodiments, data before and/or after the proper subsequence may be sequentially-read but not selected, for example, because it is not useful for fulfilling any data retrieval request.

The system implementing process 1100 may make available 1106 the proper subsequence of the sequentially-read data in a response to the data retrieval request. As described above, in some embodiments, the data retrieval request may be handled asynchronously. For example, in an embodiment, the data retrieval request may be associated with a job identifier and making available 1106 the proper sequence of data may include storing the data in a temporary data storage so that a customer may retrieve the data using the job identifier. In another embodiment, making available 1106 the proper sequence of data may include pushing the data to a customer device. In other embodiments, making available 1106 the proper sequence of data may include combining the data with other data or otherwise processing the data such as redundantly-decoding, decrypting, integrity-checking and the like.

Figure 12:
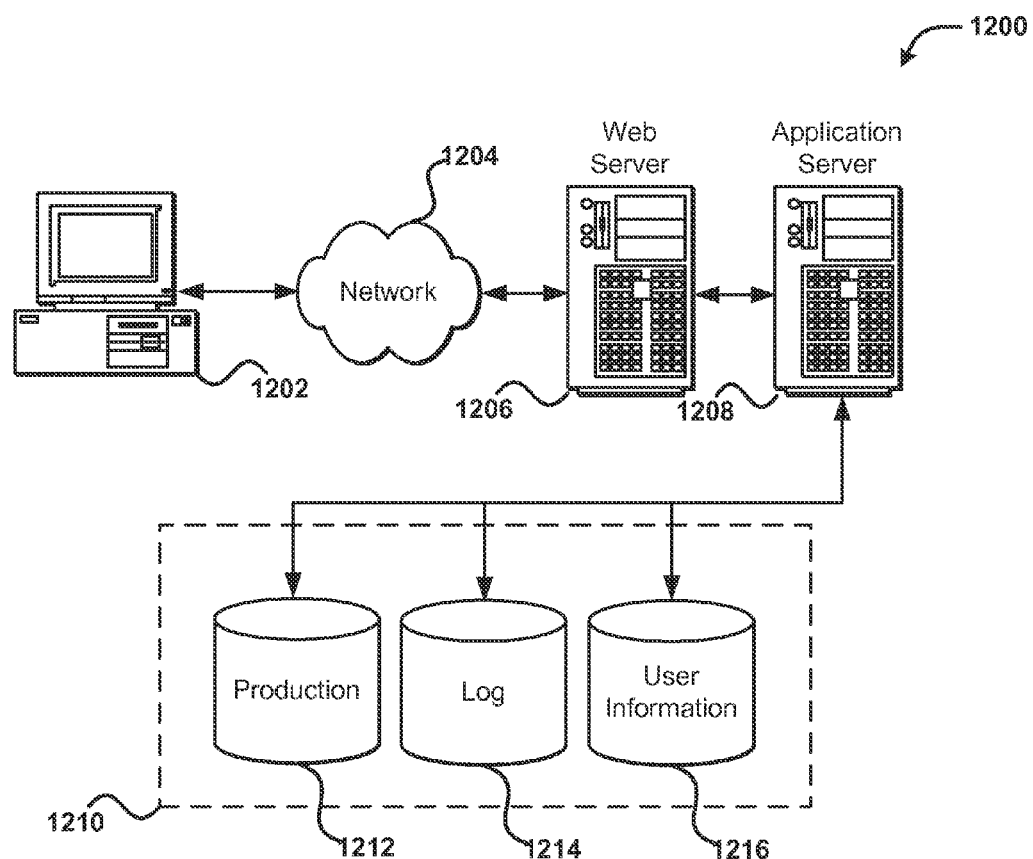
FIG. 12 illustrates an environment in which various embodiments can be implemented.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages or information over an appropriate network 1204 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more data storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable data storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for retrieving data, comprising:
    receiving, by a computer system, a retrieval request for a random read of requested data, the requested data being redundantly stored in a plurality of data storage zones of a first plurality of data storage devices;
    selecting, by the computer system, a second plurality of data storage devices that individually store the requested data;
    preparing, by the computer system, a response to the request for the random read based at least in part on sequential reads of the second plurality of data storage devices, the preparing comprising:
        determining locations of the requested data on the second plurality of data storage devices;
        selecting contiguous locations on individual data storage devices of the plurality of data storage devices based at least in part on the determined locations of the requested data, the contiguous locations having a start location and an end location, the contiguous locations selected such that the end location corresponds to one of the locations of the requested data and such that the requested data and unrequested data are located between the start location and the end location, the requested data and the unrequested data forming a portion of data that is less than a total data stored in the individual data storage devices;

sequentially reading without reading data stored in the individual data storage devices at other locations outside of the contiguous locations;

obtaining data fragments of the requested data from the sequentially-read portion of data;

during execution of the sequential read of the individual data storage devices, determining that data fragments corresponding to a subset of the requested data have been obtained; and terminating the sequential reading of the individual data storage devices based at least in part on determining that the data fragments have been obtained;

assembling the requested data from at least two of the data fragments obtained; and providing, by the computer system, the response, the response comprising the requested data assembled.

2. The computer-implemented method of claim 1, wherein selecting the second plurality of data storage devices is based at least in part on an ability to obtain data responsive to the request from the selected second plurality of data storage devices.

3. The computer-implemented method of claim 1, wherein for at least the selected second plurality of data storage devices, the sequentially-read portion of data includes all data located between the start location and the end location.

4. The computer-implemented method of claim 1, wherein the portion of the data is sequentially read based at least in part on a pre-determined schedule, wherein the schedule is independent of receiving the plurality of requests for random reads.

5. The computer-implemented method of claim 2, wherein the schedule is based at least in part on a predicted read pattern associated with reading the requested data and the unrequested data, wherein the predicted read pattern is determined from historical random read requests.

6. The computer-implemented method of claim 1, wherein the start location stores a corresponding part of the requested data and is determined based at least in part on a location identifier of the corresponding part of the requested data.

7. The computer-implemented method of claim 1, wherein the requested data comprises a first data object stored on the plurality of data storage devices, and wherein reading sequentially the at least one portion of the data comprises reading the first data object and at least a second data object contiguous to the first data object and stored on the individual data storage device.

8. The computer-implemented method of claim 1, further comprising receiving additional random read requests that are asynchronously received from one or more clients, and further comprising:

generating a retrieval job to respond to the random read request and the additional random requests, wherein the retrieval job is based at least in part on a schedule associated with sequentially reading the portion of data; and providing the one or more clients with synchronous access to the requested data based at least in part on completing the retrieval job.

9. The computer-implemented method of claim 1, further comprising:

selecting an a first data storage device of the plurality of data storage devices comprising stored data;

determining that a first set of the requested data is obtainable from the second storage device based at least in part on the stored data and that a second set of the requested data is obtainable from a first storage device of the plurality of data storage devices;

updating the end location of the contiguous locations such that the first set of the requested data is not read from the first data storage device and such that the second set of the requested data is read from the second data storage device;

sequentially reading the portion of data stored on the second data storage device based at least in part on the updated end location;

sequentially reading the second set of data from the first storage device; and obtaining the requested data based at least in part on the second set of data stored on the first data storage device and the first set of data from the second storage device.

10. The computer-implemented method of claim 1, further comprising:

initiating sequential reads at the second plurality of data storage devices; and terminating the sequential reads of at least one of the second plurality of data storage devices when the sequential reads of other storage data devices of the second plurality of data storage devices has provided sufficient data fragments to assemble the requested data.

11. A computer-implemented method for providing access to data, comprising:

receiving, by a computer system, a retrieval request for a random read of requested data, the requested data being redundantly stored in a plurality of data storage zones of a plurality of data storage devices;

selecting, by the computer system, a set of data storage zones from a plurality of data storage zones, individual data storage zones of the set of data storage zones corresponding to a single stored instance of the requested data that is redundantly stored;

determining, by the computer system, locations of the requested data within the set of data storage zones;

selecting, by the computer system, contiguous locations within the set of data storage zones based at least in part on the locations of the requested data, the contiguous locations having a start location and an end location, the contiguous locations selected such that the end location corresponds to one of the locations of the requested data and such that the requested data and unrequested data are located between the start location and the end location, the requested data and the unrequested data forming a set of data stored in an individual data storage zone of the selected set of data storage zones, the set of data being less than a total data stored in the individual data storage zone;

sequentially reading, by the computer system, the set of data that is stored in the selected set of data storage zones without reading data stored in the set of data storage zones outside of the contiguous locations;

during execution of the sequential read of the set of data storage zones, determining that data fragments corresponding to a subset of the requested data have been obtained;

terminating the sequential reading of the set of data storage zones based at least in part on determining that the data fragments have been obtained;

assembling the requested data from at least two of the data fragments; and providing, by the computer system, the data requested by the request for random read based at least in part on the assembled requested data.

12. The computer-implemented method of claim 11, wherein the selected set of data storage zones include one or more portions of one or more data storage devices.

13. The computer-implemented method of claim 11, wherein selecting the set of data storage zones is based at least in part on statistically modelable or predictable read patterns.

14. The computer-implemented method of claim 11, wherein sequentially reading the set of data from the selected set of data storage zones includes reading the set of data in the set of data storage zones in a contiguous manner.

15. A computer system for controlling data storage devices, comprising:
one or more processors; and
memory, including instructions executable by the one or more processors to cause the computer system to at least:
receive a retrieval request for a random read of requested data, the requested data being redundantly stored in a plurality of data storage zones of a plurality of data storage devices;
select, based at least in part on the retrieval request, a plurality of data storage zones associated with the requested data;
determine locations of the requested data within the plurality of data storage zones;
select contiguous locations within the plurality of data storage zones based at least in part on the locations of the requested data, the contiguous locations having a start location and an end location, the contiguous locations selected such that the end location corresponds to one of the locations of the requested data and such that the requested data and unrequested data are located between the start location and the end location, the requested data and the unrequested data forming a portion of data stored in an individual data storage zone of the selected plurality of data storage zones, the portion of data being less than a total data stored in the individual data storage zone;
sequentially read the portion of data stored in the plurality of data storage zones without reading data stored in the plurality of data storage zones outside of the contiguous locations;
during execution of the sequential read of the plurality of data storage zones, determine that data fragments corresponding to a subset of the requested data have been obtained; and
terminate the sequential reading of the plurality of data storage zones based at least in part on determining that the data fragments have been obtained;
assembling the requested data from at least two of the data fragments;
provide the requested data based at least in part on the assembled requested data.

16. The computer system of claim 15, wherein sequentially reading the data from the plurality of data storage zones is performed asynchronously with respect to one another.

17. The computer system of claim 15, wherein sequentially reading the data from the plurality of data storage zones starts at different locations within the plurality of data storage zones.

18. The computer system of claim 15, wherein the sequentially-read data from the individual data storage zones includes only a subset of a plurality of data components of the requested data, the plurality of data components being sufficient to provide the requested data.

19. The computer system of claim 18, wherein providing the requested data includes redundantly decoding at least the plurality of data components.

20. One or more non-transitory computer-readable storage media having collectively stored thereon executable instructions that, when executed by one or more processors of a computer system, cause the computer system to at least:
receive an asynchronous data retrieval request for a random read of requested data, the requested data being redundantly stored in a plurality of data storage zones of a plurality of data storage devices;
determine locations of the requested data within a plurality of data storage zones;
select contiguous locations within the plurality of data storage zones based at least in part on the locations of the requested data, the contiguous locations individually having a start location and an end location, the contiguous locations selected such that the end location corresponds to one of the locations of the requested data and such that the requested data and unrequested data are located between the start location and the end location, the requested data and the unrequested data forming a sequence of sequentially-stored data in an individual data storage zone of the plurality of data storage zones, the sequence being less than a total data stored in the individual data storage zone;
read the sequence of sequentially-stored data from the plurality of data storage zones without reading data stored in the data storage zone outside of the contiguous locations;
during execution of the sequential read of the plurality of data storage zones, determine that data fragments corresponding to a subset of the requested data have been obtained; and
terminating the sequential reading of the plurality of data storage zones based at least in part on determining that the data fragments have been obtained;
assemble a proper subsequence of the data fragments; and
make available the proper subsequence of the data fragments in a response to the asynchronous data retrieval request.

21. The one or more computer-readable storage media of claim 20, wherein selecting the proper subsequence of the data fragments is performed in response to the asynchronous data retrieval request and wherein making available the proper subsequence of the data fragments includes transmitting proper subsequence of the data fragments in response to a synchronous data request.

22. The one or more computer-readable storage media of claim 20, wherein reading the sequence of sequentially-stored data includes one or more read operations, each of the one or more read operations read a portion of data.

23. The one or more computer-readable storage media of claim 22, wherein the size of the portion of data is configured at least in part to optimize one or more performance characteristics.

* * * * *